(12) United States Patent
Gormley et al.

(10) Patent No.: US 11,760,498 B2
(45) Date of Patent: Sep. 19, 2023

(54) ENGINE MOUNT WAITING FAIL SAFE DETECTION

(71) Applicant: ROHR, INC., Chula Vista, CA (US)

(72) Inventors: Timothy Gormley, Bonita, CA (US); Jihad Ramlaoui, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 363 days.

(21) Appl. No.: 17/128,083

(22) Filed: Dec. 19, 2020

(65) Prior Publication Data

US 2022/0194609 A1   Jun. 23, 2022

(51) Int. Cl.
   *B64D 27/26*   (2006.01)

(52) U.S. Cl.
   CPC ........ *B64D 27/26* (2013.01); *B64D 2027/266* (2013.01); *B64D 2027/268* (2013.01)

(58) Field of Classification Search
   CPC .............. B64D 27/26; B64D 2027/266; B64D 2027/268
   See application file for complete search history.

(56) References Cited

U.S. PATENT DOCUMENTS

| | | | |
|---|---|---|---|
| 4,997,145 A * | 3/1991 | Hodgkinson | B64D 27/26 244/54 |
| 10,759,542 B2 | 9/2020 | Couffignal et al. | |
| 2012/0080582 A1* | 4/2012 | Rogero | B64D 27/26 248/554 |

FOREIGN PATENT DOCUMENTS

| | | | |
|---|---|---|---|
| FR | 2891253 | 3/2007 | |
| FR | 2958623 | 10/2011 | |
| FR | 2958623 A1 * | 10/2011 | ............. B64D 27/26 |
| FR | 2958623 | 5/2012 | |
| FR | 3058986 | 5/2018 | |
| FR | 3093704 | 9/2020 | |
| GB | 2224707 | 5/1990 | |

OTHER PUBLICATIONS

Translation of FR-2958623-A1 (Year: 2011).*
European Patent Office; European Search Report dated Apr. 28, 2022 in Application No. 21211322.9.

* cited by examiner

*Primary Examiner* — Christopher D Hutchens
*Assistant Examiner* — Steven J Shur
(74) *Attorney, Agent, or Firm* — SNELL & WILMER L.L.P.

(57) ABSTRACT

A system for mounting a gas turbine engine to a pylon and for detecting a failure within the system, the gas turbine engine comprising a first case, is disclosed. In various embodiments, the system includes a first mount connecting the first case to the pylon; and a first sensor configured to detect a first relative motion between the first case and the first mount.

20 Claims, 7 Drawing Sheets

ENGINE MOUNT WAITING FAIL SAFE DETECTION

FIELD

The present disclosure relates generally to gas turbine engines and, more particularly, to systems used two detect rigid body motion of a gas turbine engine with respect to a pylon to which the gas turbine engine is mounted.

BACKGROUND

A turbofan engine includes a fan section and an engine core. The fan section is housed within a fan case. The engine core is housed within a core engine case. The core engine case is typically connected to the fan case through a plurality of support struts and outlet guide vanes. The turbofan engine may be mounted to an aircraft pylon through a forward mount and an aft mount. The forward mount may be axially aligned with a plurality of outlet guide vanes and connects an aft portion of the fan case to the pylon. The aft mount connects an aft portion of the core engine case to the pylon. A waiting fail safe may be incorporated into each of the forward mount and the aft mount. The waiting fail safe becomes active in the event the forward mount or the aft mount fails and is configured to limit movement (e.g., rotation) of the engine with respect to the pylon in the event of such failure. Typically, the waiting fails safes are monitored during routine inspection of the engine to determine whether one or the other has become active during a flight. Such inspection currently involves the inspection of the mounts and the waiting fail safes and a possible dismantling of portions of the engine, which can be time consuming and requires the aircraft be grounded during the inspection process.

SUMMARY

A system for mounting a gas turbine engine to a pylon and for detecting a failure within the system, the gas turbine engine comprising a first case, is disclosed. In various embodiments, the system includes a first mount connecting the first case to the pylon; and a first sensor configured to detect a first relative motion between the first case and the first mount.

In various embodiments, the first case extends along an axial centerline of the gas turbine engine. In various embodiments, the first mount includes a first mount beam configured for attachment to the pylon and a first flange configured for attachment to the first case, a first link configured to connect the first mount beam to the first flange and a second link configured to connect the first mount beam to the first flange. In various embodiments, a first waiting fail safe lug is disposed between the first mount beam and the first flange. In various embodiments, the first case is a fan case configured to surround a fan section of the gas turbine engine. In various embodiments, the first case is a core engine case configured to surround a core engine of the gas turbine engine. In various embodiments, the first sensor is housed within the pylon and connected to at least one of the first link, the second link, the first waiting fail safe lug of the first flange via a shaft or a cable.

In various embodiments, the system further includes a second mount and a second case, the second mount connecting the second case to the pylon, and a second sensor configured to detect a second relative motion between the second case and the second mount. In various embodiments, the first case extends along an axial centerline of the gas turbine engine and the second case extends along the axial centerline. In various embodiments, the first mount includes a first mount beam configured for attachment to the pylon and a first flange configured for attachment to the first case, a first link configured to connect the first mount beam to the first flange, a second link configured to connect the first mount beam to the first flange and a first waiting fail safe lug disposed between the first mount beam and the first flange. In various embodiments, the second mount includes a second mount beam configured for attachment to the pylon and a second flange configured for attachment to the second case, a third link configured to connect the second mount beam to the second flange, a fourth link configured to connect the second mount beam to the second flange and a second waiting fail safe lug disposed between the second mount beam and the second flange. In various embodiments, the first case is a fan case configured to surround a fan section of the gas turbine engine. In various embodiments, the second case is a core engine case configured to surround a core engine of the gas turbine engine.

A system for mounting a gas turbine engine to a pylon and for detecting a failure within the system, the gas turbine engine comprising a fan case and a core engine case, is disclosed. In various embodiments, the system includes a first mount connecting the fan case to the pylon; a first sensor configured to detect a first relative motion between the fan case and the first mount; a second mount connecting the core engine case to the pylon; and a second sensor configured to detect a second relative motion between the core engine case and the second mount.

In various embodiments, the first mount includes a first mount beam configured for attachment to the pylon and a first flange configured for attachment to the fan case, a first link configured to connect the first mount beam to the first flange and a second link configured to connect the first mount beam to the first flange. In various embodiments, a first waiting fail safe lug is disposed between the first mount beam and the first flange. In various embodiments, the second mount includes a second mount beam configured for attachment to the pylon and a second flange configured for attachment to the core engine case, a third link configured to connect the second mount beam to the second flange and a fourth link configured to connect the second mount beam to the second flange. In various embodiments, a second waiting fail safe lug disposed between the second mount beam and the second flange. In various embodiments, the second sensor is housed within the pylon and connected to the second mount via a shaft, a link or a cable. In various embodiments, the second sensor is housed within the pylon and connected to at least one of the third link, the fourth link, the second waiting fail safe lug or the second flange via a shaft, a link, or a cable.

A system for mounting a gas turbine engine to a pylon and for detecting a failure within the system is disclosed. In various embodiments, the gas turbine engine includes a case and the system includes an active mount rigidly connecting the case to the pylon, the active mount configured to provide an active load path between the case and the pylon; a backup mount loosely connecting the case to the pylon, the backup mount configured to provide a waiting load path between the case and the pylon; and a sensor configured to detect a relative motion between the case and the pylon.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
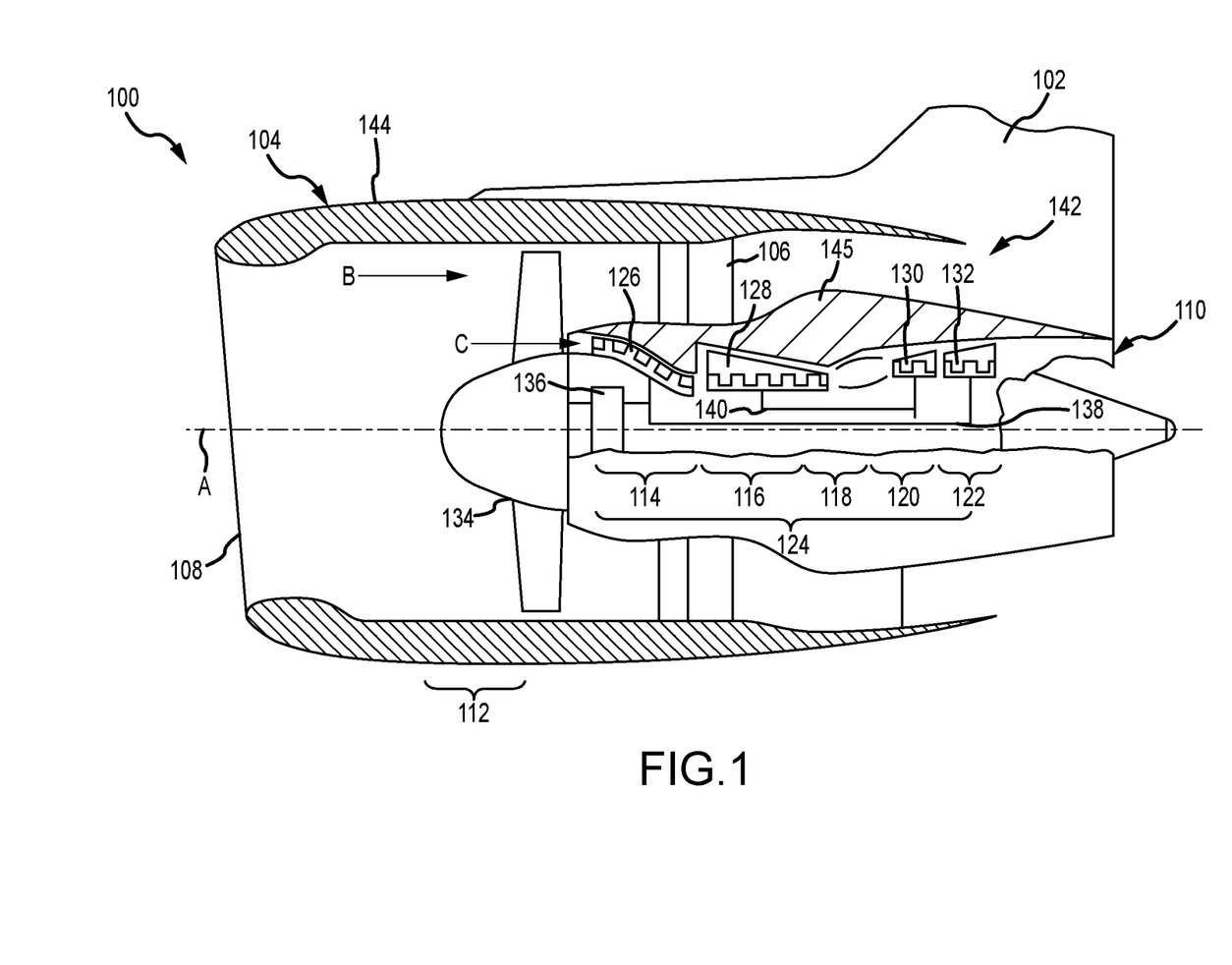
FIG. 1 is a side cutaway illustration of a gas turbine engine system, in accordance with various embodiments.

Referring now to the drawings, FIG. 1 provides a side cutaway illustration of a gas turbine engine system 100. The gas turbine engine system 100 includes a pylon 102 and a gas turbine engine 104 (e.g., a propulsion system) such as, for example, a geared turbofan engine that uses an outlet guide vane 106 (OGV) (or a plurality of outlet guide vanes) to structurally connect a fan module to a core engine module as well as straighten the airflow thru the bypass duct. The gas turbine engine 104 is mounted to the pylon 102, which may be mounted to or otherwise configured with an aircraft airframe. Examples of an aircraft airframe include, but are not limited to, an aircraft wing or an aircraft fuselage.

The gas turbine engine 104 extends along an axial centerline A between an airflow inlet 108 and an airflow core exhaust 110. The gas turbine engine 104 includes a fan section 112, a low pressure compressor section 114 (LPC), a high pressure compressor section 116 (HPC), a combustor section 118, a high pressure turbine section 120 (HPT) and a low pressure turbine section (LPT) 122. The engine sections are typically arranged sequentially along the axial centerline A. The low pressure compressor section 114 (LPC), the high pressure compressor section 116 (HPC), the combustor section 118, the high pressure turbine section 120 (HPT) and the low pressure turbine section 122 (LPT) form a core 124 (or an engine core) of the gas turbine engine 104.

Each of the low pressure compressor section 114 (LPC), the high pressure compressor section 116 (HPC), the high pressure turbine section 120 (HPT) and the low pressure turbine section 122 (LPT) typically include a rotor having a plurality of rotor blades arranged circumferentially around and connected to one or more respective rotor disks—e.g., a low pressure compressor rotor 126, a high pressure compressor rotor 128, a high pressure turbine rotor 130 and a low pressure turbine rotor 132. A fan rotor 134 is connected to a gear train 136. The gear train 136 and the low pressure compressor rotor 126 are connected to and driven by the low pressure turbine rotor 132 through a low speed shaft 138 (or a low speed spool). The high pressure compressor rotor 128 is connected to and driven by the high pressure turbine rotor 130 through a high speed shaft 140 (or a high speed spool).

Air enters the gas turbine engine 104 (e.g., the propulsion system) through the airflow inlet 108, and is directed through the fan section 112 and into a core gas flow path C and a bypass gas flow path B. The air within the core gas flow path C may be referred to as "core air." The air within the bypass gas flow path B may be referred to as "bypass air." The core air is directed through the low pressure compressor section 114, the high pressure compressor section 116, the combustor section 118, the high pressure turbine section 120 and the low pressure turbine section 122 and exits the gas turbine engine 104 through the airflow core exhaust 110. Within the combustor section 118, fuel is injected into and mixed with the core air and ignited to provide a hot airstream that drives the turbine sections. The bypass air is directed through the bypass gas flow path B, and out of the gas turbine engine 104 through an airflow bypass exhaust 142 to provide forward engine thrust. The bypass air may also or alternatively be directed through a thrust reverser to provide reverse engine thrust. A fan nacelle 144 is typically employed to surround the various sections of the gas turbine engine 104 and a core nacelle 145 is typically employed to surround the various sections of the core 124.

Figure 2A:
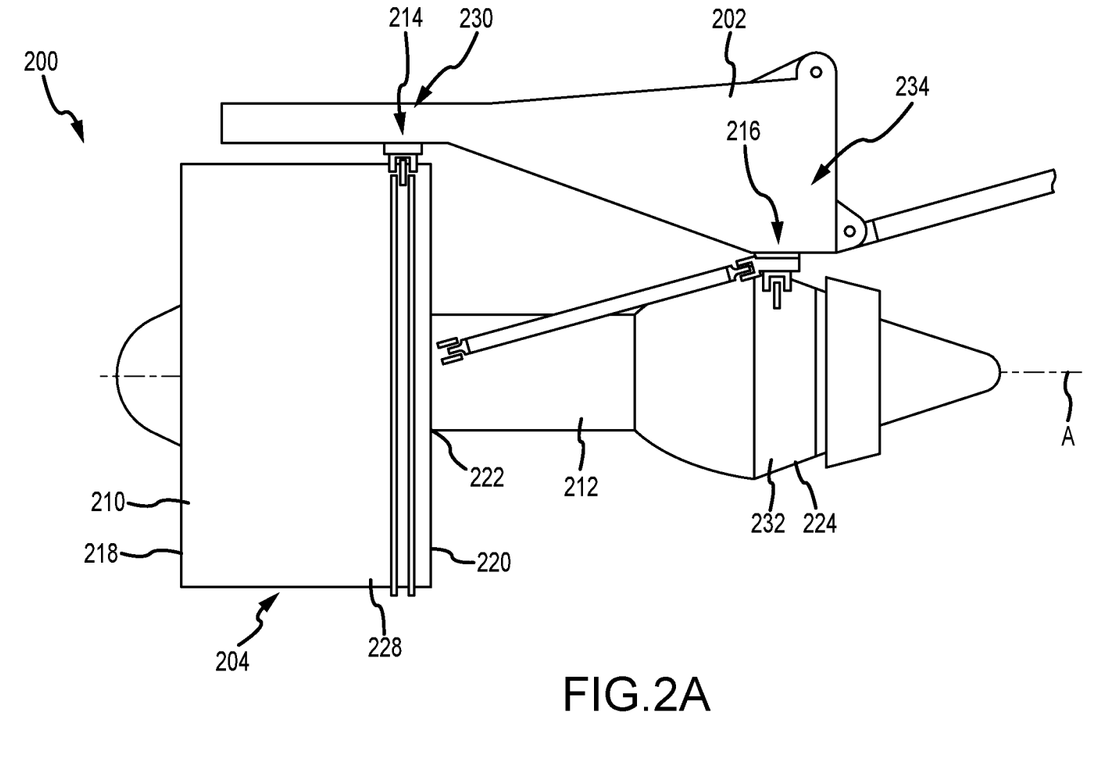
FIG. 2A is a side illustration of an assembly for mounting a gas turbine engine to a pylon, in accordance with various embodiments.
Figure 2B:
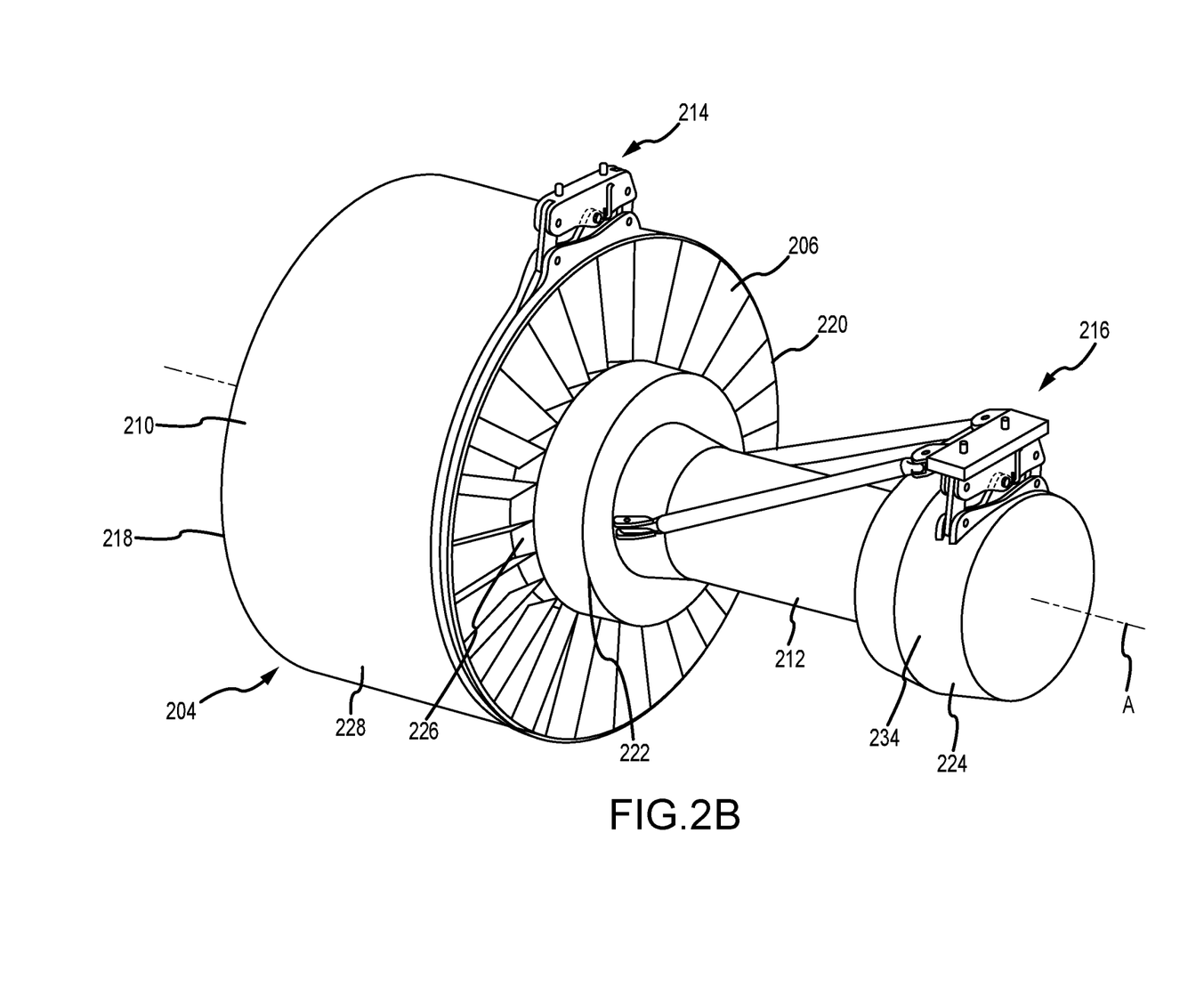
FIG. 2B is a perspective illustration of the mounting assembly and the gas turbine engine of FIG. 2A, in accordance with various embodiments.

Referring now to FIGS. 2A and 2B, a side illustration and a perspective illustration of a mounting assembly 200 for mounting a gas turbine engine 204 to a pylon 202, such as, for example, the gas turbine engine 104 and the pylon 102 described above, are provided. The mounting assembly 200 includes, in various embodiments, a first case 210 (or a fan case) and a second case 212 (or a core engine case). A first mount 214 (or a forward mount) is configured to mount the first case 210 to the pylon 202 and a second mount 216 (or an aft mount) in configured to mount the second case 212 to the pylon 202. Note the terms "forward" and "aft" are used herein to describe relative position within the gas turbine engine; e.g., a first element described as being "forward" of a second element means the first element is closer along an axial centerline to the air inlet or fane section of the engine, with the air inlet or fan section being forward of the turbine section.

As indicated above, the first case 210 may be configured as a fan case. For example, referring to FIG. 1, the first case 210 may house a fan section, such as, for example, the fan section 112, and may be housed within a nacelle, such as the fan nacelle 144 described above. The first case 210 extends axially along an axial centerline A between a forward end 218 of the first case 210 and an aft end 220 of the first case 210 and extends circumferentially around the axial centerline A. The first case 210 may have a diameter that may be, for example, between about two and eight times greater than maximum and minimum diameters respectively of the second case 212. The mounting assembly 200, however, is not limited to any dimensional relationship between the first case 210 and the second case 212 or any other part of the gas turbine engine 204. The second case 212 may be configured as a core engine case. For example, referring to FIG. 1, the second case 212 may house at least a portion of the core 124. The second case 212 may also be housed within a core nacelle, such as, for example, the core nacelle 145 described above, where the fan nacelle 144 and the core nacelle 145 define the bypass gas flow path B shown in FIG. 1.

Referring again to FIGS. 2A and 2B, the second case 212 extends axially along the axial centerline A between a forward end 222 of the second case 212 and an aft end 224 of the second case 212. The second case 212 extends circumferentially around the axial centerline A and is substantially coaxial with the first case 210. A forward portion 226 of the second case 212 adjacent the forward end 222 of the second case 212 may be arranged radially within the first case 210. A plurality of outlet guide vanes 206 (similar to the outlet guide vane 106 described above) is arranged circumferentially around the axial centerline A, and radially between the first case 210 and the second case 212. The plurality of outlet guide vanes 206 may connect and extend radially between the forward portion 226 of the second case 212 and an aft portion 228 of the first case 210. One or more of the plurality of outlet guide vanes 206, for example, may each be configured as a structural outlet guide vane that structurally ties the first case 210 and the second case 212 together. The plurality of outlet guide vanes 206 also guides the flow of bypass air through the bypass gas flow path B shown in FIG. 1. Alternatively, one or more of the plurality of outlet guide vanes 206 may each include a strut that extends radially through a vane fairing. The strut structurally ties the first case 210 and the second case 212 together. The fairing guides the flow of bypass air through the bypass gas flow path B.

Still referring to FIGS. 2A and 2B, the first mount 214 (or the forward mount) is configured to mount the first case 210 to the pylon 202 and the second mount 216 (or an aft mount) in configured to mount the second case 212 to the pylon 202. As illustrated, the first mount 214 and the second mount 216 are configured and arranged to structurally tie each of the first case 210 and the second case 212 to the pylon 202 at a plurality of different axial locations along the centerline A. More particularly, the first mount 214 (or the forward mount) ties the aft portion 228 of the first case 210 (or the fan case) to a first portion 230 (or a forward portion) of the pylon 202. The second mount 216 (or the aft mount) may also structurally tie the forward portion 226 of the second case 212 to the first portion 230 of the pylon 202 through one or more of the plurality of outlet guide vanes 206. The second mount 216 (or the aft mount) ties an aft portion 232 of the second case 212 to a second portion 234 (or an aft portion) of the pylon 202, structurally independent of the first mount 214.

Figure 3A:
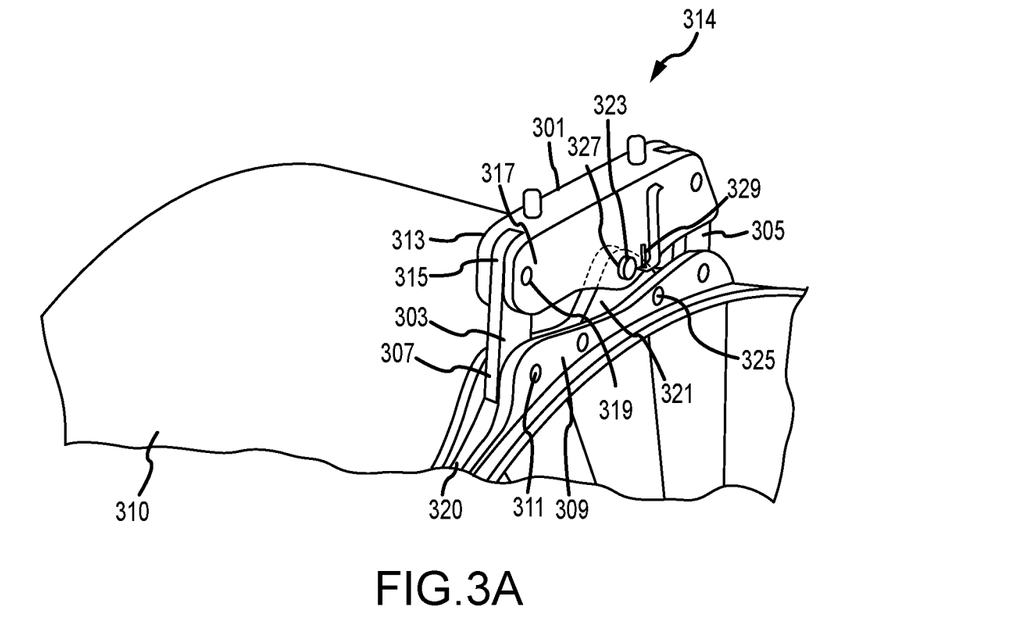
FIG. 3A is a perspective view of a first or a forward mount for mounting a gas turbine engine to a pylon, in accordance with various embodiments.

Referring now to FIG. 3A, a first mount 314 (or a forward mount), similar to the first mount 214 described above, is illustrated. The first mount 314 includes a first mount beam 301, a first link 303 (or a first mount first link) and a second link 305 (or a first mount second link). The first link 303 and the second link 305 are axially aligned with one another, and typically arranged circumferentially around the axial centerline A (see, e.g., FIG. 2B). Each of the first link 303 and the second link 305 is connected to a first case 310 (or a fan case), similar to the first case 210 described above, at an aft end 320 of the first case 310. For example, an eye or spherical bearing at an inner end 307 of the first link 303 (and the second link 305) is attached to a pair of flanges 309 (or a first flange or a first flange assembly) on the first case 310 by a fastener 311. Each of the first link 303 and the second link 305 extends substantial radially (or, in various embodiments, substantially laterally or tangentially) away from the first case 310 and is connected to a respective lateral end 313 of the first mount beam 301. For example, an eye or spherical bearing at an outer end 315 of the first link 303 (and the second link 305) is attached to a pair of tabs 317 on the first mount beam 301 by a fastener 319. For sake of clarity, the terms "inner" and "outer" are used here to describe radial position relative to an axial centerline A within the engine; e.g., the inner end 307 is located radially inside of the outer end 315, and therefore closer to the axial centerline. Referring again to FIG. 2A, the first mount beam 301 (e.g., the first mount 214) is attached to the pylon 202 by one or more fasteners. Without loss of generality, the first link 303 and the second link 305 are each configured to provide a primary or an active mount (together with at least one of the pair of flanges 309 and at least one of the pair or tabs 317) rigidly connecting the first case 310 to a pylon (e.g., the pylon 202 shown in FIG. 2A), where the primary or the active mount are configured to provide a primary or an active load path between the first case 310 and the pylon.

Still referring to FIG. 3A, the first mount 314 includes a first waiting fail safe lug 321 (or a first waiting fail safe link). The first waiting fail safe lug 321 is arranged laterally between the first link 303 and the second link 305 and extends radially between the first mount beam 301 and the pair of flanges 309. In various embodiments, the first waiting fail safe lug 321 is rigidly connected (e.g., via a fully tightened bolt, weld or other fastener) to the first case 310. The first waiting fail safe lug 321 is connected to the pair of flanges 309 by a second fastener 325 (or by a pair of fasteners). In various embodiments, the first fastener 323 is arranged within an oversized orifice 327 that provides for a "loose coupling" between the first waiting fail safe lug 321 and the first mount beam 301. Note that reference to a "loose coupling" means the coupling is not rigidly connected or not fully tightened by a fastener (e.g., a bolt), or the coupling is configured to provide no load path until another coupling (e.g., one of the first link 303 and the second link 305) fails. In this manner, the first waiting fail safe lug 321 may be substantially unloaded when the first link 303 and the second link 305 are intact, but will structurally tie the first mount beam 301 to the pair of flanges 309 if one or both of the first link 303 and the second link 305 fails. For example, in a situation where the first link 303 fails (e.g., the link itself fractures or one of the fastener 311 or the fastener 319 fails), the first case 310 will typically rotate away from the first link 303 and about the second link 305 until being stopped by the first waiting fail safe lug 321 (e.g., when the first fastener 323 makes contact with an aperture boundary or wall of the oversized orifice 327). Without loss of generality, the first waiting fail safe lug 321 is configured to provide a backup mount (together with at least one of the pair of flanges 309 and at least one of the pair or tabs 317) loosely connecting the first case 310 to a pylon (e.g., the pylon 202 shown in FIG. 2A), where the backup mount is configured to provide a waiting load path between the first case 310 and the pylon.

As described further below, a first sensor 329 is connected to the first mount beam 301 and configured to detect such failure of the first link 303 (e.g., by detecting a first relative motion between the first mount beam 301 and the first case 310) and to report such failure to the cockpit. Note that reference to the term "sensor" includes any sensor, such as, for example, a proximity sensor, configured to detect relative motion between two objects. Such sensors may include, for example, and without limitation, electromagnetic, capacitive, photoelectric or inductive-based sensors or proximity sensors. Note also that reference to the term "relative motion" refers to any motion between two objects, including translational, rotational or vibrational motion in any of three degrees of motion (e.g., an XYZ Cartesian coordinate system).

Figure 3B:
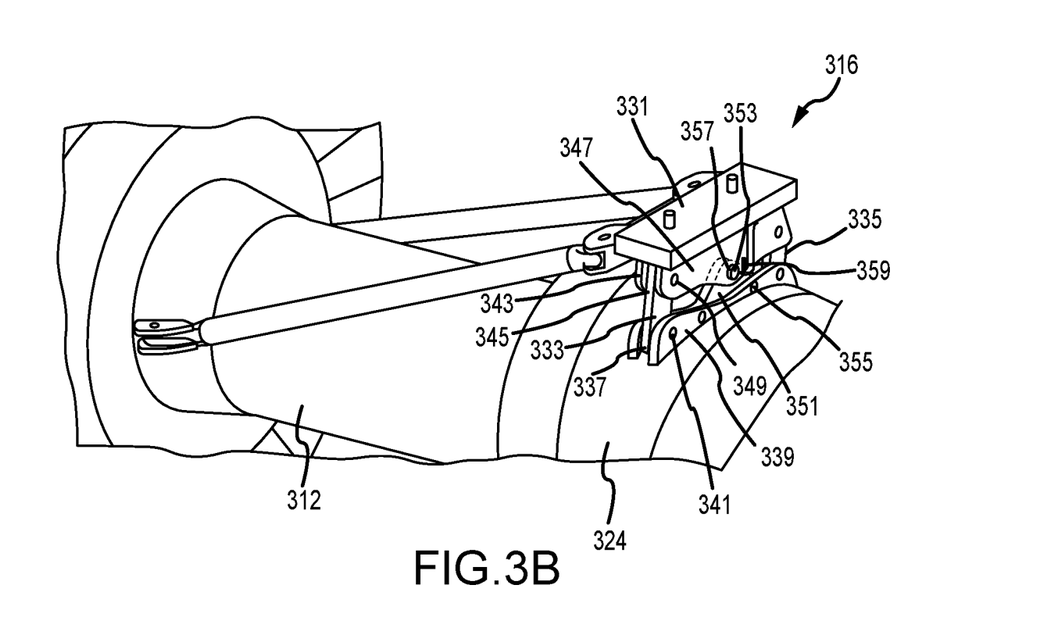
FIG. 3B is a perspective view of a second or an aft mount for mounting a gas turbine engine to a pylon, in accordance with various embodiments.

Referring now to FIG. 3B, a second mount 316 (or an aft mount), similar to the second mount 216 described above, is illustrated. The second mount 316 includes a second mount beam 331, a first link 333 (or a second mount first link or a third link) and a second link 335 (or a second mount second link or a fourth link). The first link 333 and the second link 335 are axially aligned with one another, and typically arranged circumferentially around the axial centerline A (see, e.g., FIG. 2B). Each of the first link 333 and the second link 335 is connected to a second case 312 (or a core engine case), similar to the second case 212 described above, at an aft end 324 of the second case 312. For example, an eye or spherical bearing at an inner end 337 of the first link 333 (and the second link 335) is attached to a pair of flanges 339 (or a second flange or a second flange assembly) on the second case 312 by a fastener 341. Each of the first link 333 and the second link 335 extends substantial radially (or laterally) away from the second case 312 and is connected to a respective lateral end 343 of the second mount beam 331. For example, an eye or spherical bearing at an outer end 345 of the first link 333 (and the second link 335) is attached to a pair of tabs 347 on the second mount beam 331 by a fastener 349. For sake of clarity, the terms "inner" and "outer" are used here to describe radial position relative to an axial centerline A within the engine; e.g., the inner end 337 is located radially inside of the outer end 345, and therefore closer to the axial centerline. Referring again to FIG. 2A, the second mount beam 331 (e.g., the second mount 316) is attached to the pylon 202 by one or more fasteners. Without loss of generality, the first link 333 and the second link 335 are each configured to provide a primary or an active mount (together with at least one of the pair of flanges 339 and at least one of the pair or tabs 347) rigidly connecting the second case 312 to a pylon (e.g., the pylon 202 shown in FIG. 2A), where the primary or the active mount are configured to provide a primary or an active load path between the second case 312 and the pylon.

Still referring to FIG. 3B, the second mount 316 includes a second waiting fail safe lug 351 (or a second waiting fail safe link). The second waiting fail safe lug 351 is arranged laterally between the first link 333 and the second link 335 and extends radially between the second mount beam 331 and the pair of flanges 339. The second waiting fail safe lug 351 is connected to the second mount beam 331 by a first fastener 353. The second waiting fail safe lug 351 is connected to the pair of flanges 339 by a second fastener 355 (or by a pair of fasteners). In various embodiments, the first fastener 353 is arranged within an oversized orifice 357 that provides for a "loose coupling" between the second waiting fail safe lug 351 and the second mount beam 331. In this manner, the second waiting fail safe lug 351 may be substantially unloaded when the first link 333 and the second link 335 are intact, but will structurally tie the second mount beam 331 to the pair of flanges 339 if one or both of the first link 333 and the second link 335 fails. For example, in a situation where the first link 333 fails (e.g., the link itself fractures or one of the fastener 341 or the fastener 349 fails), the second case 312 will typically rotate away from the first link 333 and about the second link 335 until being stopped by the second waiting fail safe lug 351 (e.g., the first fastener 353 makes contact with the oversized orifice 357). Without loss of generality, the second waiting fail safe lug 351 is configured to provide a backup mount (together with at least one of the pair of flanges 339 and at least one of the pair or tabs 347) loosely connecting the second case 312 to a pylon (e.g., the pylon 202 shown in FIG. 2A), where the backup mount is configured to provide a waiting load path between the second case 312 and the pylon. As described further below, a second sensor 359 is connected to the second mount beam 331 and configured to detect such failure of the first link 333 (e.g., by detecting a second relative motion between the second mount beam 331 and the second case 312) and to report such failure to the cockpit.

Figure 4A:
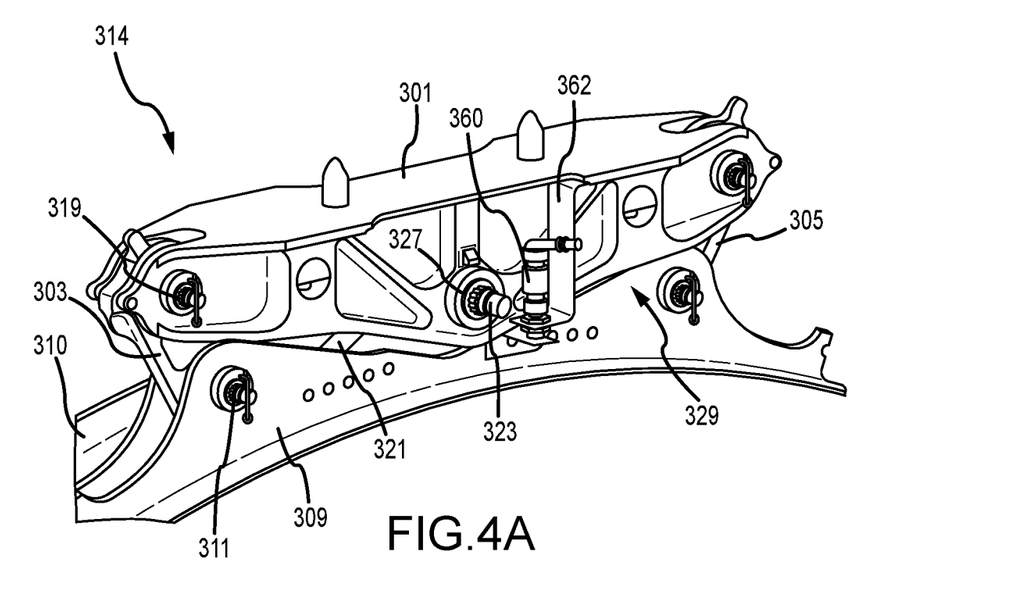
FIGS. 4A and 4B are schematic views of a first or a forward mount for mounting a gas turbine engine to a pylon, in accordance with various embodiments.
Figure 4B:
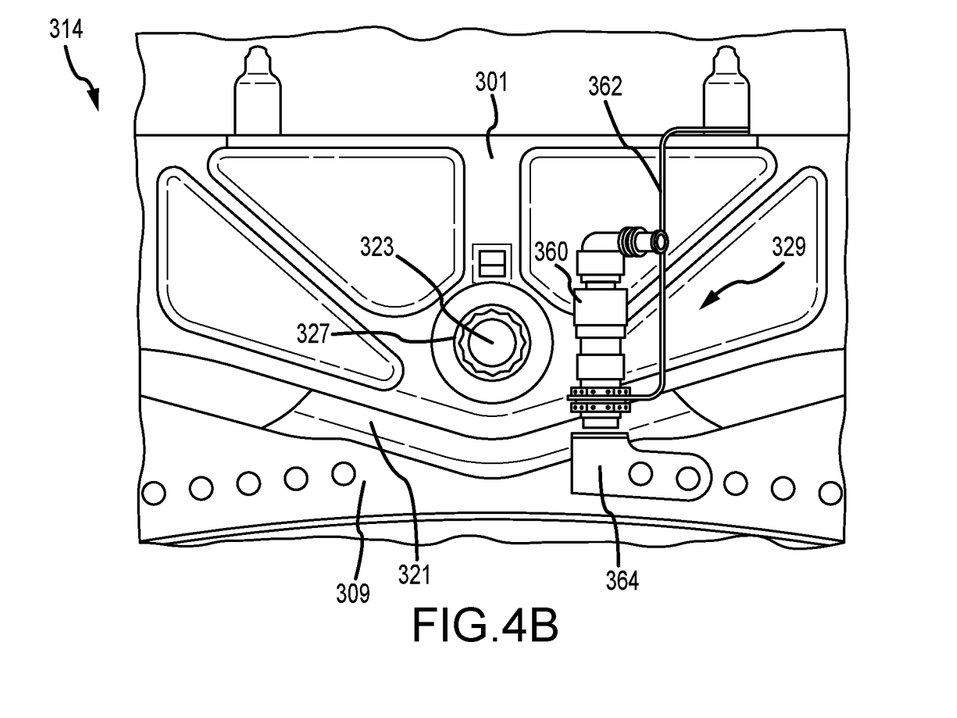

Referring now to FIGS. 4A and 4B, further details of the first sensor 329 described above are illustrated with respect to the first mount 314. As illustrated, the first sensor 329 includes a first proximity switch 360 mounted to the first mount beam 301 via a first bracket 362. The first sensor 329 further includes a first target 364 mounted to one of the pair of flanges 309. As described above, in a situation where the first link 303 fails (e.g., the link itself fractures or one of the fastener 311 or the fastener 319 fails), the first case 310 will typically rotate away from the first link 303 and about the second link 305 until being stopped by the first waiting fail safe lug 321 (e.g., the first fastener 323 makes contact with the oversized orifice 327). As the first case 310 rotates away from the first link 303, the first target 364 will move away from the first proximity switch 360, thereby triggering the first proximity switch 360 to report the failure to the cockpit.

Figure 5A:
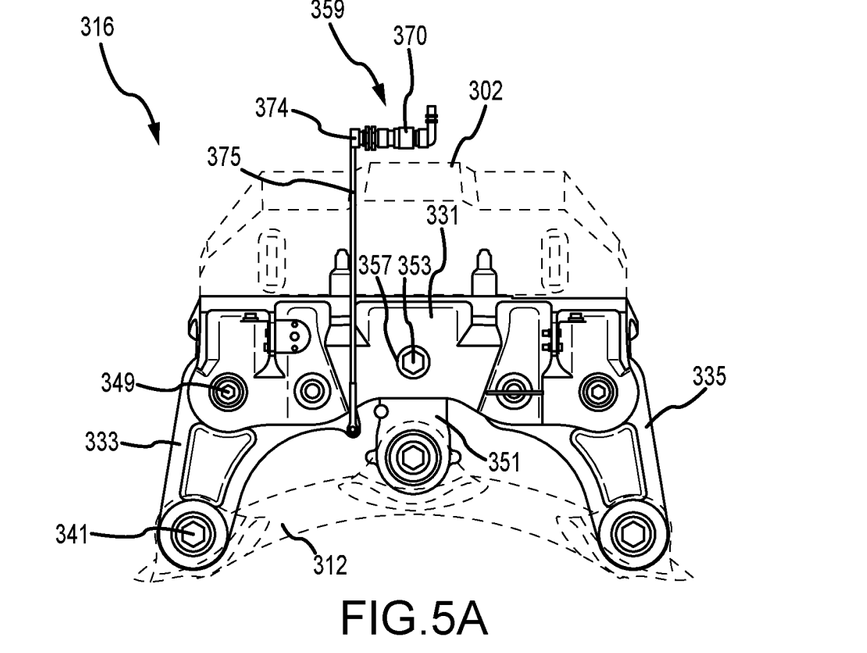
FIGS. 5A and 5B are schematic views of a second or an aft mount for mounting a gas turbine engine to a pylon, in accordance with various embodiments.
Figure 5B:
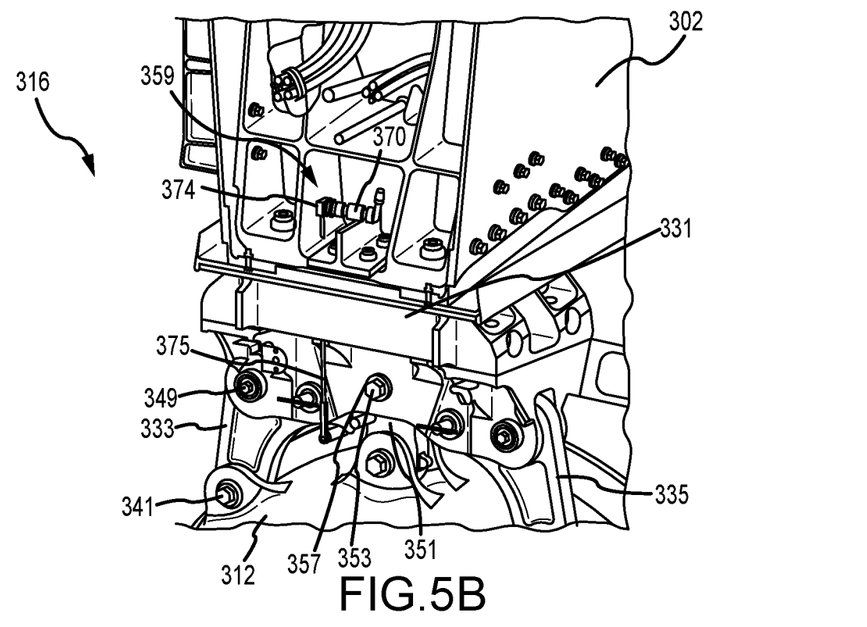

Referring now to FIGS. 5A and 5B, further details of the second sensor 359 described above are illustrated with respect to the second mount 316. As illustrated, the second sensor 359 includes a second proximity switch 370 mounted to the pylon 302 in a region where the second sensor 359 is removed from a high temperature zone that may be experienced in the region of the second mount beam 331. The second sensor 359 further includes a second target 374 that is connected to either the second case 312 or to structure that is connected to the second case, such as, for example, the first link 333. In various embodiments, the connection is accomplished via a shaft 375 (or a cable or the link). As similarly described above, in a situation where the first link 333 fails (e.g., the link itself fractures or one of the fastener 341 or the fastener 349 fails), the second case 312 will typically rotate away from the first link 333 and about the second link 335 until being stopped by the second waiting fail safe lug 351 (e.g., the first fastener 353 makes contact with the oversized orifice 357). As the second case 312 rotates away from the first link 333, the second target 374 will move away from the second proximity switch 370, thereby triggering the second proximity switch 370 to report the failure to the cockpit. Note that while the shaft 375 is illustrated connected to the first link 333, the disclosure contemplates the shaft 375 being connected to one or more of the first link 333, the second link 335, the second waiting fail safe lug 351 or to the second case 312.

Figure 6A:
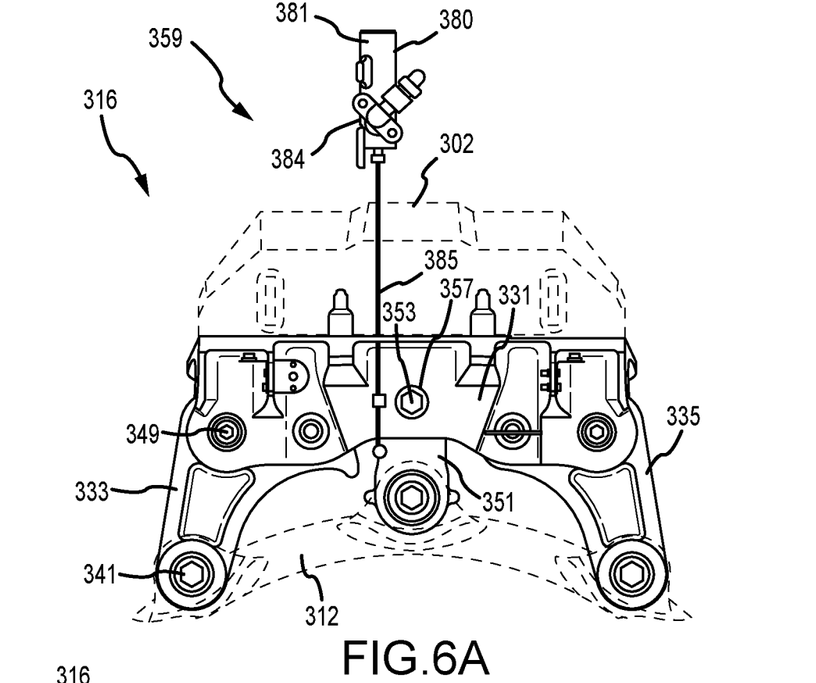
FIGS. 6A and 6B are schematic views of a second or an aft mount for mounting a gas turbine engine to a pylon, in accordance with various embodiments.
Figure 6B:
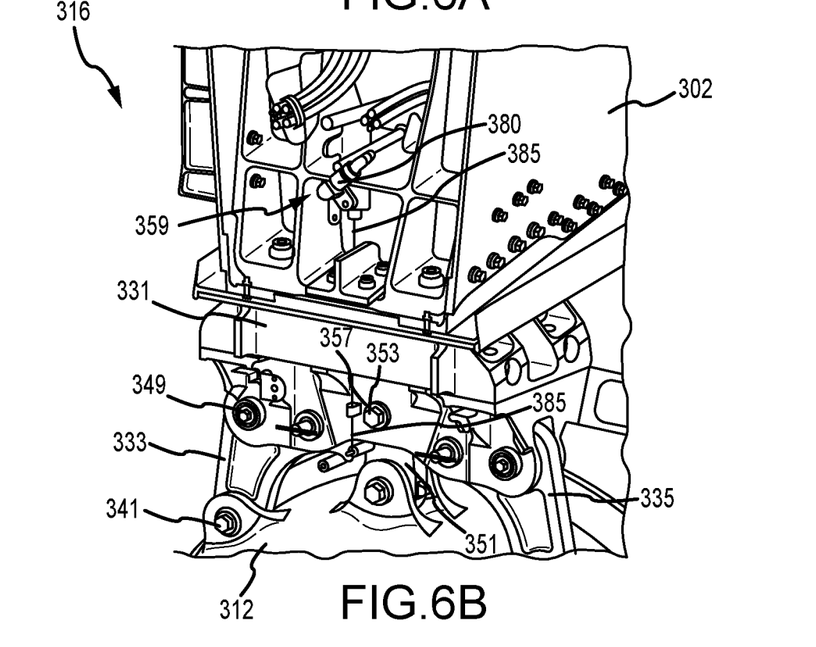

Referring now to FIGS. 6A and 6B, a further embodiment describing details of the second sensor 359 is illustrated with respect to the second mount 316. As illustrated, the second sensor 359 includes a second proximity switch 380 mounted to the pylon 302 in a region where the second sensor 359 is removed from a high temperature zone that may be experienced in the region of the second mount beam 331. In various embodiments, the second proximity switch 380 may be housed within a spring cartridge 381, together with a second target 384 that is connected to either the second case 312 or to structure that is connected to the second case, such as, for example, the second waiting fail safe lug 351. In various embodiments, the connection is accomplished via a cable 385 (or a shaft or the link). As similarly described above, in a situation where the first link 333 fails (e.g., the link itself fractures or one of the fastener 341 or the fastener 349 fails), the second case 312 will typically rotate away from the first link 333 and about the second link 335 until being stopped by the second waiting fail safe lug 351 (e.g., the first fastener 353 makes contact with the oversized orifice 357). As the second case 312 rotates away from the first link 333, the second target 384 will move away from the second proximity switch 380, thereby triggering the second proximity switch 380 to report the failure to the cockpit. Note that while the cable 385 is illustrated connected to the second waiting fail safe lug 351, the disclosure contemplates the cable 385 being connected to one or more of the first link 333, the second link 335, the second waiting fail safe lug 351 or to the second case 312.

The foregoing disclosure provides a system for monitoring a mounting assembly used to mount a gas turbine engine to a pylon of an aircraft. Various benefits of the system include real-time monitoring of the integrity of the mounting assembly, which may alert a pilot to a failure, thereby enabling the pilot to take evasive action with knowledge of the failure. The evasive action may include, for example, pursuing less rigorous flight maneuvers that might place additional or more severe stresses on the mounting assembly that could lead to further failures. The disclosure also provides a manner of locating the sensors in regions of a pylon that experience less severe thermal or aerodynamic loads that would otherwise occur in the regions of the mounts. Additional benefits include being able to detect and make repairs to the mounting assemblies as the failures occur, or immediately following their occurrence, rather than waiting until routine maintenance for such detection and repair of failures to occur.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for mounting a gas turbine engine to a pylon and for detecting a failure within the system, the gas turbine engine comprising a first case, comprising:
   a first mount connecting the first case to the pylon, the first mount including a first flange configured for attachment to the first case; and
   a first sensor configured to detect a first relative motion between the first case and the first mount, the first sensor including a first proximity switch and a first target anchored to the first flange, the first target moving away from the first proximity switch in response to the first relative motion between the first case and the first mount.

2. The system of claim 1, wherein the first case extends along an axial centerline of the gas turbine engine.

3. The system of claim 2, wherein the first mount further includes a first mount beam configured for attachment to the pylon, a first link configured to connect the first mount beam to the first flange and a second link configured to connect the first mount beam to the first flange.

4. The system of claim 3, further comprising a first waiting fail safe lug disposed between the first mount beam and the first flange.

5. The system of claim 4, wherein the first case is a fan case configured to surround a fan section of the gas turbine engine.

6. The system of claim 4, wherein the first case is a core engine case configured to surround a core engine of the gas turbine engine.

7. The system of claim 4, wherein the first sensor is housed within the pylon and connected to at least one of the first link, the second link, the first waiting fail safe lug of the first flange via a shaft or a cable.

8. The system of claim 1, further comprising a second mount and a second case, the second mount connecting the second case to the pylon, and a second sensor configured to detect a second relative motion between the second case and the second mount, the second sensor including a second proximity switch and a second target, the second target moving away from the second proximity switch in response to the second relative motion between the second case and the second mount.

9. The system of claim 8, wherein the first case extends along an axial centerline of the gas turbine engine and the second case extends along the axial centerline.

10. The system of claim 9, wherein the first mount includes a first mount beam configured for attachment to the pylon, a first link configured to connect the first mount beam to the first flange, a second link configured to connect the first mount beam to the first flange and a first waiting fail safe lug disposed between the first mount beam and the first flange.

11. The system of claim 10, wherein the second mount includes a second mount beam configured for attachment to the pylon and a second flange configured for attachment to the second case, a third link configured to connect the second mount beam to the second flange, a fourth link configured to connect the second mount beam to the second flange and a second waiting fail safe lug disposed between the second mount beam and the second flange.

12. The system of claim 11, wherein the first case is a fan case configured to surround a fan section of the gas turbine engine.

13. The system of claim 12, wherein the second case is a core engine case configured to surround a core engine of the gas turbine engine.

14. A system for mounting a gas turbine engine to a pylon and for detecting a failure within the system, the gas turbine engine comprising a fan case and a core engine case, comprising:
   a first mount connecting the fan case to the pylon;
   a first sensor configured to detect a first relative motion between the fan case and the first mount, the first sensor including a first proximity switch and a first target anchored to the first mount, the first target moving away from the first proximity switch in response to the first relative motion between the fan case and the first mount;
   a second mount connecting the core engine case to the pylon; and
   a second sensor configured to detect a second relative motion between the core engine case and the second mount, the second sensor including a second proximity switch and a second target, the second target moving away from the second proximity switch in response to the second relative motion between the core engine case and the second mount.

15. The system of claim 14, wherein the first mount includes a first mount beam configured for attachment to the pylon and a first flange configured for attachment to the fan case, a first link configured to connect the first mount beam to the first flange and a second link configured to connect the first mount beam to the first flange.

16. The system of claim 15, further comprising a first waiting fail safe lug disposed between the first mount beam and the first flange.

17. The system of claim 16, wherein the second mount includes a second mount beam configured for attachment to the pylon and a second flange configured for attachment to the core engine case, a third link configured to connect the second mount beam to the second flange and a fourth link configured to connect the second mount beam to the second flange.

18. The system of claim 17, further comprising a second waiting fail safe lug disposed between the second mount beam and the second flange and wherein the second sensor is housed within the pylon and connected to at least one of the third link, the fourth link, the second waiting fail safe lug or the second flange via a shaft, a cable or a link.

19. The system of claim 14, wherein the second sensor is housed within the pylon and connected to the second mount via a shaft, a cable or a link.

20. A system for mounting a gas turbine engine to a pylon and for detecting a failure within the system, the gas turbine engine comprising a case, the system comprising:
   an active mount rigidly connecting the case to the pylon, the active mount configured to provide an active load path between the case and the pylon;
   a backup mount loosely connecting the case to the pylon, the backup mount configured to provide a waiting load path between the case and the pylon; and
   a sensor configured to detect a relative motion between the case and the pylon, the sensor including a proximity switch and a target, the target configured to move away from the proximity switch in response to the relative motion between the case and the pylon.

* * * * *